UNITED STATES PATENT OFFICE.

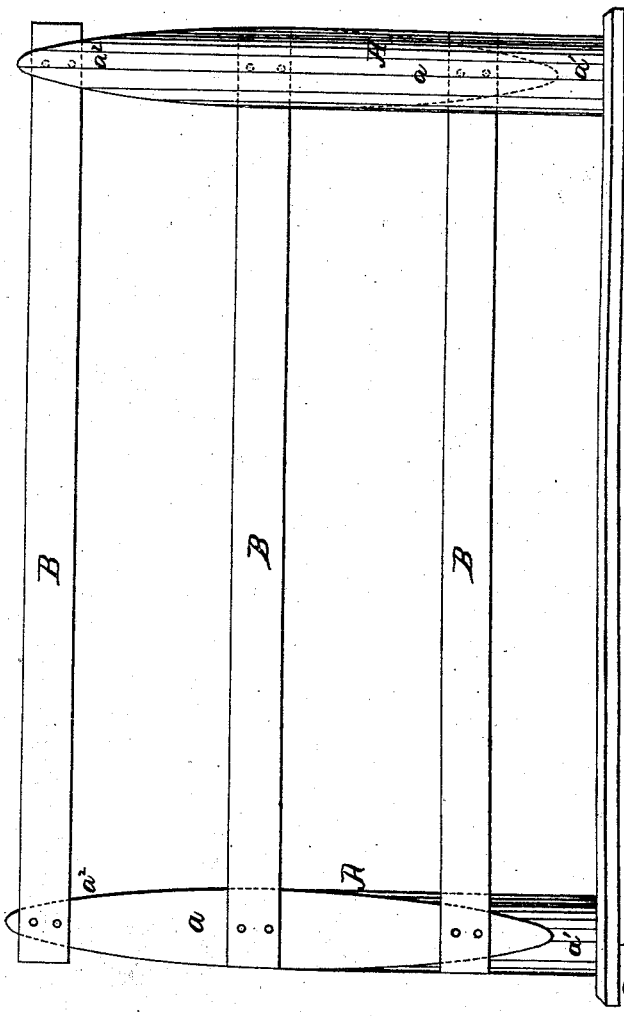

CHARLES H. WAPLER, OF SAGINAW, MICHIGAN.

IMPROVEMENT IN FENCES.

Specification forming part of Letters Patent No. 184,274, dated November 14, 1876; application filed August 25, 1876.

*To all whom it may concern:*

Be it known that I, CHARLES H. WAPLER, of Saginaw, county of Saginaw, in the State of Michigan, have invented an Improvement in Fences, of which the following is a full, clear, and exact description, reference being had to the accompanying drawings, forming part of this specification.

My invention relates to the ordinary wooden board or rail fence; and it consists in a fence the posts of which are set in the ground at an angle inclined toward the line of the boards or rails, and alternately upon opposite sides of said boards or rails, and having their faces, to which the said boards or rails are fastened, perpendicular to the face of the ground, as hereinafter more particularly set forth, whereby the fence-posts may be readily and economically formed, two being cut from a single cylindrical piece of timber, and whereby the lower or ground ends of the posts are heavy, while the upper or board ends are light, and whereby the whole fence is more securely braced in the ground, and is better able to withstand the attacks of cattle or the force of storms and wind.

Figure 1 is an elevation of a section of a fence embodying my invention, and Fig. 2 is an end view of the same.

A are the fence-posts. B are the boards or rails. These posts A are set in the ground at an angle inclined toward the line of the boards B, as shown plainly in Fig. 2, and are arranged alternately upon opposite sides of the said boards, as seen in same figure. The posts are preferably placed one at the ends of each section of boards, on opposite sides thereof, as described, and the ends of the boards constituting adjacent sections meet at and upon each post. The faces $a$ of the posts adjacent to and upon which the ends of the boards are fastened, are cut away, so that the said face $a$ of each post is perpendicular to the surface of the ground, whereby the boards, on being secured to the posts at either end of the section, will rest flat against the posts, and be in a line perpendicular to the ground, one above the other, and the entire structure of the fence thus have a proper upright position in the ground.

One advantage of my invention is, that the posts of the fence may be cheaply and economically formed by sawing diagonally through a single cylindrical or other shaped piece of timber or log, thus producing from the said single log or piece two complete posts, having the heavy ground ends $a^1$, the light upper ends $a^2$, and with the flat faces $a$, which will be perpendicular to the surface of the ground when the posts are set at an angle in the ground inclined toward the line of the boards, upon opposite sides thereof. Another advantage of my invention is, that a fence constructed as above described will, while it is upright in the ground, at the same time be more securely braced in position by the posts, and be better able to withstand the attacks of cattle, and to endure the wind and storms, and not be displaced or affected thereby, than similar fences built in the ordinary manner.

What I claim as my invention, and desire to secure by Letters Patent, is—

A fence formed of the posts A set in the ground at an angle inclined toward the line of the boards B, and alternately on opposite sides thereof, the said posts having the faces $a$, to which the said boards are secured, perpendicular to the surface of the ground, as described, and for the purpose specified.

CHARLES HENRY WAPLER.

Witnesses:
 N. S. WOOD,
 W. C. BUSCH.